(12) United States Patent
Li et al.

(10) Patent No.: US 12,096,100 B2
(45) Date of Patent: *Sep. 17, 2024

(54) IMAGE SENSOR WITH IMAGE RECEIVER AND AUTOMATIC IMAGE COMBINING

(71) Applicant: CISTA SYSTEM CORP., San Jose, CA (US)

(72) Inventors: Zhaojian Li, Fremont, CA (US); Jiangtao Pang, Fremont, CA (US)

(73) Assignee: Cista System Corp., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,460

(22) Filed: Jul. 11, 2023

(65) Prior Publication Data

US 2023/0353847 A1    Nov. 2, 2023

Related U.S. Application Data

(63) Continuation of application No. 17/825,524, filed on May 26, 2022, now Pat. No. 11,765,447, which is a
(Continued)

(51) Int. Cl.
*H04N 23/45* (2023.01)
*H04N 5/265* (2006.01)
(Continued)

(52) U.S. Cl.
CPC ............ *H04N 23/45* (2023.01); *H04N 5/265* (2013.01); *H04N 13/158* (2018.05); *H04N 23/741* (2023.01)

(58) Field of Classification Search
CPC ...... H04N 23/45; H04N 5/265; H04N 13/158; H04N 23/741
See application file for complete search history.

(56) References Cited

U.S. PATENT DOCUMENTS 11,032,460 B2   6/2021  Li et al.
11,418,692 B2   8/2022  Li et al.
(Continued)

OTHER PUBLICATIONS

Non-Final Office Action dated May 7, 2020, issued in related U.S. Appl. No. 16/251,272 (14 pages).
(Continued)

*Primary Examiner* — Farzana Hossain
(74) *Attorney, Agent, or Firm* — Sheppard Mullin Richter & Hampton LLP

(57) ABSTRACT

Provided are an image sensor with one or more image receivers for image combining, and an imaging system and method therefor. The image sensor includes an image sensor array to generate first image data for a first image; a receiver to receive, into the image sensor, second image data for a second image; an image combination circuit coupled to the image sensor array and the receiver to receive the first image data and the second image data and combine the first image data and the second image data into combined image data for a single combined image, according to one or more image combination criteria, and at least one of the first image data and the second image data; and a transmitter coupled to the image combination circuit to transmit the combined image data for the combined image from the image sensor.

20 Claims, 5 Drawing Sheets

Related U.S. Application Data continuation of application No. 17/239,987, filed on Apr. 26, 2021, now Pat. No. 11,418,692, which is a continuation of application No. 16/251,272, filed on Jan. 18, 2019, now Pat. No. 11,032,460.

(51) Int. Cl.
  *H04N 13/106* (2018.01)
  *H04N 23/741* (2023.01)

(56) References Cited

U.S. PATENT DOCUMENTS

| | | | | |
|---|---|---|---|---|
| 11,765,447 | B2* | 9/2023 | Li | H04N 23/741 |
| | | | | 348/43 |
| 2007/0024737 | A1* | 2/2007 | Nakamura | H04N 23/651 |
| | | | | 348/335 |
| 2012/0081519 | A1 | 4/2012 | Goma et al. | |
| 2014/0192213 | A1 | 7/2014 | Han et al. | |
| 2018/0324362 | A1 | 11/2018 | Chen et al. | |
| 2019/0124277 | A1 | 4/2019 | Mabuchi | |

OTHER PUBLICATIONS

Final Office Action dated Sep. 9, 2020, issued in related U.S. Appl. No. 16/251,272 (21 pages).

Non-Final Office Action dated Dec. 22, 2020, issued in related U.S. Appl. No. 16/251,272 (19 pages).

Notice of Allowance dated Mar. 11, 2021, issued in related U.S. Appl. No. 16/251,272 (11 pages).

Non-Final Office Action dated Feb. 25, 2022, issued in related U.S. Appl. No. 17/239,987 (18 pages).

Non-Final Office Action dated Jan. 24, 2023, issued in related U.S. Appl. No. 17/825,524 (26 pages).

* cited by examiner

IMAGE SENSOR WITH IMAGE RECEIVER AND AUTOMATIC IMAGE COMBINING

CROSS REFERENCE TO RELATED APPLICATIONS

The present application is a continuation of U.S. patent application Ser. No. 17/825,524, filed May 26, 2022, entitled "IMAGE SENSOR WITH IMAGE RECEIVER AND AUTOMATIC IMAGE COMBINING," which is a continuation of U.S. patent application Ser. No. 17/239,987, filed Apr. 26, 2021, now U.S. Pat. No. 11,418,692, entitled "IMAGE SENSOR WITH IMAGE RECEIVER AND AUTOMATIC IMAGE COMBINING," which is a continuation of U.S. patent application Ser. No. 16/251,272, filed Jan. 18, 2019, now U.S. Pat. No. 11,032,460, entitled "IMAGE SENSOR WITH IMAGE RECEIVER AND AUTOMATIC IMAGE COMBINING." The above-referenced applications are incorporated herein by reference in their entirety.

TECHNICAL FIELD

The present disclosure generally relates to the field of solid-state image sensor arrays, particularly to solid-state image sensor arrays having receivers for receiving additional images.

BACKGROUND

Digital cameras, scanners, and other imaging devices often use image sensors, such as charge-coupled device (CCD) image sensors or complementary metal-oxide-semiconductor (CMOS) image sensors, to convert optical signals to electrical signals for storage, processing, display, and the like. Recently, imaging devices have begun to include multiple image sensors, for example to capture images using multiple spectra, multiple subjects, and the like.

SUMMARY

In general, one aspect disclosed features an imaging system comprising: an image sensor comprising a first image sensor array to generate first image data for a first image, a receiver to receive, into the image sensor, second image data for a second image, an image combination circuit coupled to the first image sensor array and the receiver to receive the first image data and the second image data and combine the first image data and the second image data into combined image data for a single combined image, according to one or more image combination criteria, and at least one of the first image data and the second image data, and a transmitter coupled to the image combination circuit to transmit the combined image data for the combined image from the image sensor; and a second image sensor array coupled to the image sensor to generate the second image data for the second image.

Embodiments of the imaging system may include one or more of the following features. Some embodiments comprise an image signal processor to process the selected one of the first image data and the second image data into a processed image. Some embodiments comprise a display to display the processed image. In some embodiments, the first image includes a scene; the second image includes the scene; and the combined image is a high dynamic range image. In some embodiments, the first image includes a subject; the second image includes the subject; and the combined image is a three-dimensional (3D) image. In some embodiments, the first image and the second image are captured substantially concurrently. In some embodiments, the image sensor, and an image sensor capturing the second image, possess different image capture characteristics, wherein the image capture characteristics include at least one of: pixel size; sensitivity; read noise; gain; exposure time; and spectrum.

In general, one aspect disclosed features an image sensor comprising: an image sensor array to generate first image data for a first image; a receiver to receive, into the image sensor, second image data for a second image; an image combination circuit coupled to the image sensor array and the receiver to receive the first image data and the second image data and combine the first image data and the second image data into combined image data for a single combined image, according to one or more image combination criteria, and at least one of the first image data and the second image data; and a transmitter coupled to the image combination circuit to transmit the combined image data for the combined image from the image sensor.

Embodiments of the image sensor may include one or more of the following features. In some embodiments, the first image includes a scene; the second image includes the scene; and the combined image is a high dynamic range image. In some embodiments, the first image includes a subject; the second image includes the subject; and the combined image is a three-dimensional (3D) image. In some embodiments, the first image and the second image are captured substantially concurrently. In some embodiments, the image sensor, and an image sensor capturing the second image, possess different image capture characteristics, wherein the image capture characteristics include at least one of: pixel size; sensitivity; read noise; gain; exposure time; and spectrum. In some embodiments, the receiver is a Mobile Industry Processor Interface (MIPI) receiver; and the transmitter is a MIPI transmitter. Some embodiments comprise a single integrated circuit comprising the image sensor.

In general, one aspect disclosed features a method for image sensor, the method comprising: generating, in an image sensor array of the image sensor, first image data for a first image, responsive to receiving light; receiving into the image sensor, second image data for a second image; combining the first image data and the second image data into combined image data for a single combined image, according to one or more image combination criteria, and at least one of the first image data and the second image data; and transmitting the combined image data for the combined image from the image sensor.

Embodiments of the method may include one or more of the following features. In some embodiments, the first image includes a scene; the second image includes the scene; and the combined image is a high dynamic range image. In some embodiments, the first image includes a subject; the second image includes the subject; and the combined image is a three-dimensional (3D) image. In some embodiments, the first image and the second image are captured substantially concurrently. In some embodiments, the image sensor, and an image sensor capturing the second image, possess different image capture characteristics, wherein the image capture characteristics include at least one of: pixel size; sensitivity; read noise; gain; exposure time; and spectrum. In some embodiments, the receiver is a Mobile Industry Processor Interface (MIPI) receiver; and the transmitter is a MIPI transmitter.

BRIEF DRAWINGS DESCRIPTION

The present disclosure describes various embodiments that may be understood and fully appreciated in conjunction with the following drawings.

DETAILED DESCRIPTION

Figure 1:
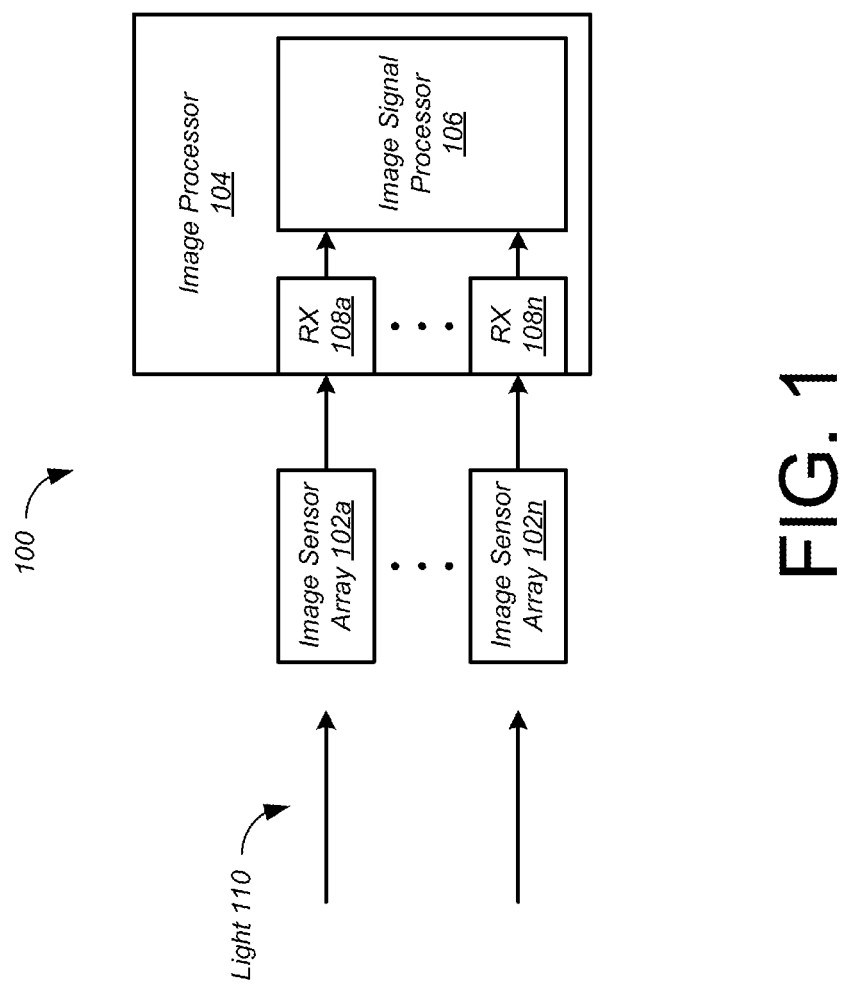
FIG. 1 illustrates a conventional imaging system using multiple image sensor arrays.

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

FIG. 1 illustrates a conventional imaging system using multiple image sensor arrays. Referring to FIG. 1, the imaging system 100 includes a plurality of image sensor arrays 102a through 102n, and an image processor 104. Each image sensor array 102 generates image data responsive to receiving light 110, for example such as light reflected by, or radiated by, a subject. The image processor 104 includes an image signal processor 106 for processing the image data generated by the image sensor arrays 102. In the conventional imaging system 100 of FIG. 1, the image processor 104 must include multiple receivers (RX) 108a through 108n to receive the image data from the multiple image sensor arrays 102a through 102n. In particular, the image processor 104 must include a separate receiver 108 for each image sensor array 102.

Figure 2:
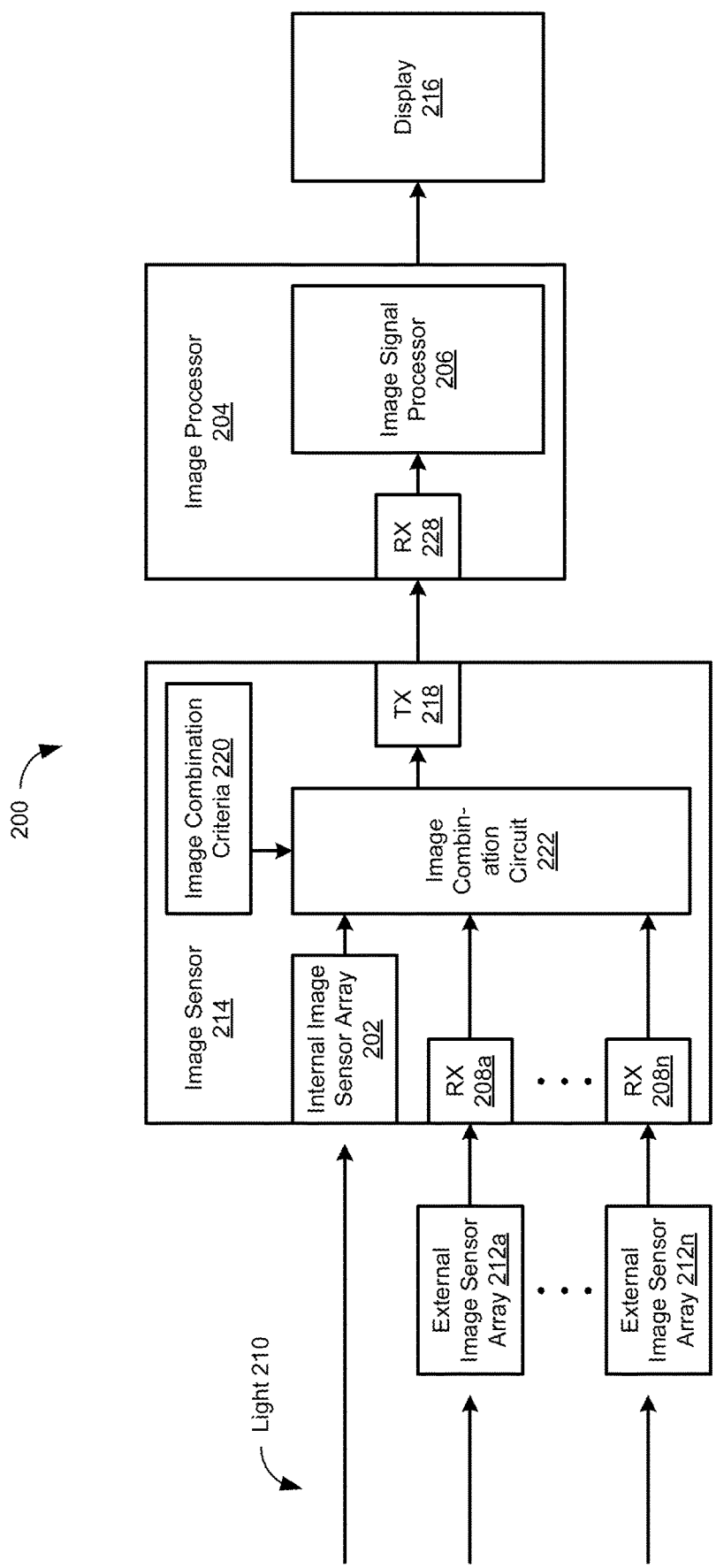
FIG. 2 illustrates an imaging system that includes an image sensor having an image data receiver and automatic image combining according to the technology disclosed herein.

FIG. 2 illustrates an imaging system that includes an image sensor having an image data receiver and automatic image combining according to the technology disclosed herein. Referring to FIG. 2, the imaging system 200 includes an image sensor 214, an image processor 204, a display 216, and one or more external image sensor arrays 212a through 212n. The external image sensor arrays 212a through 212n are referred to herein as "external" because they are external to the image sensor 214. The image processor 204 includes an image signal processor 206, and a single receiver 228. The image sensor 214 includes an internal image sensor array 202, one or more receivers 208a through 208n, a single transmitter (TX) 218, an image combination circuit 222, and image combination criteria 220. The image sensor 214 may be fabricated as a single integrated circuit. The image sensor arrays 202, 212 may be fabricated using any suitable technology. For example, the image sensor arrays 202, 212 may be fabricated as arrays of CMOS CCDs. The image sensor arrays 202, 212 may all be fabricated using the same technology, or using different technologies. In some embodiments, each receiver 208, 228 is a Mobile Industry Processor Interface (MIPI) receiver, and transmitter 218 is a MIPI transmitter. That is, receivers 208, 228 and transmitter 218 operate according to a MIPI specification. But in other embodiments, receivers 208, 228 and transmitter 218 may operate according to other specifications.

Figure 3:
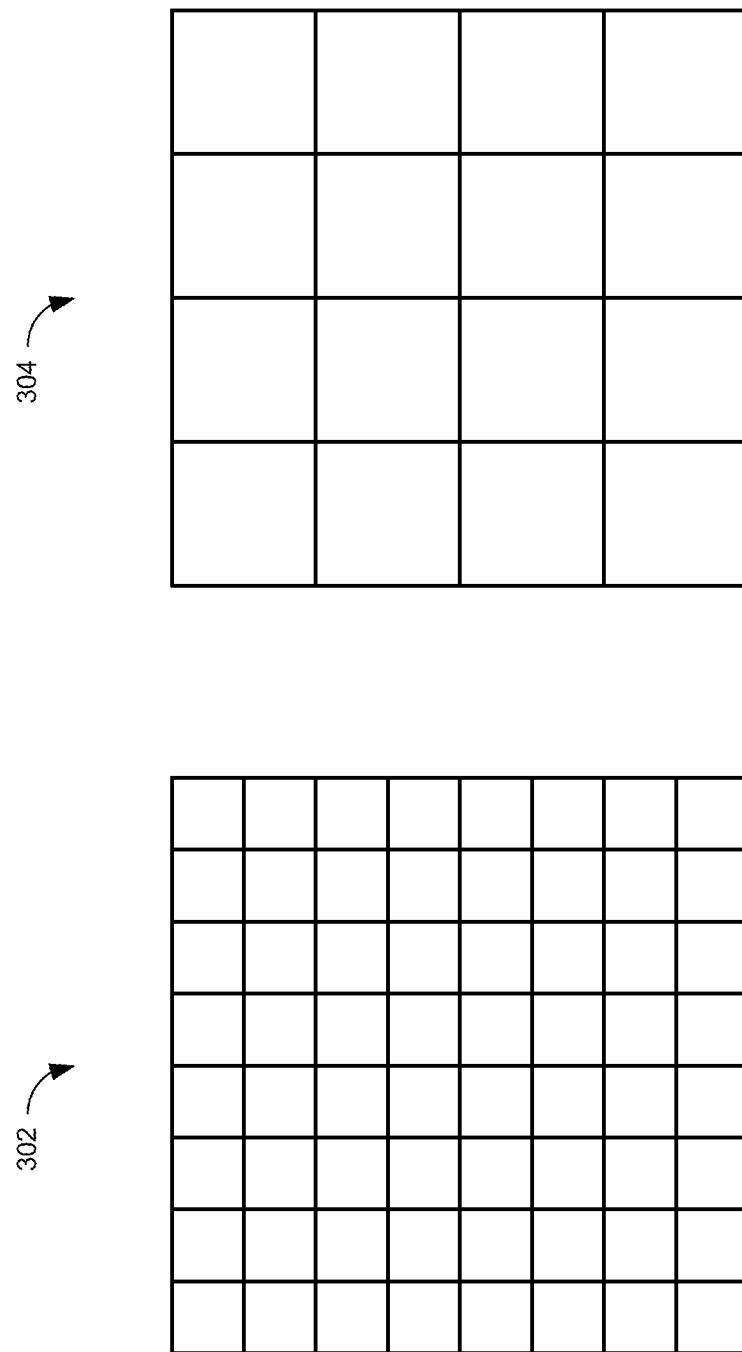
FIG. 3 illustrates two image sensor arrays having the same optical format but different image capture characteristics.

In some embodiments, while the image sensor arrays 202, 212 may have the same optical format, one or more of the image sensor arrays 202, 212 may possess different image capture characteristics. These image capture characteristics may include, for example, pixel size, sensitivity, read noise, gain, exposure time, spectrum, other image capture characteristics, any combination thereof, and the like. FIG. 3 illustrates two image sensor arrays having the same optical format but different image capture characteristics. Referring to FIG. 3, two image sensor arrays 302, 304 are illustrated. Both image sensor arrays 302, 304 have the same optical format. That is, both image sensor arrays 302, 304 have the same size and shape. However, the image sensor arrays 302, 304 have different pixel sizes. In particular, the pixels of the image sensor array 304 are four times as large as the pixels of the image sensor array 302.

By having multiple image sensor arrays 202, 212 with different image capture characteristics, multiple concurrent images of a subject or scene having different qualities may be combined into a single image that is preferable to any of its constituent images. For example, combining images of a scene captured using differing gain and exposure times may yield a combined image having extended bit depth and extended dynamic range. Such combinations minimize motion artifacts, and deliver superior image quality in the most demanding and difficult lighting conditions.

Various embodiments may be employed to combine concurrent images of a subject from different viewpoints, and to combine the images to create a three-dimensional (3D) image. Such a 3D image may be used with 3D printing techniques to reproduce the subject, at the same size or at different scales.

In the example of FIG. 3, the image sensor array 304 having larger pixel size will possess higher sensitivity, and less read noise, than the image sensor array 302 having smaller pixel size. Accordingly, for dark scenes, the image produced by the image sensor array 304 having larger pixel sizes will have a higher quality than the image produced by the image sensor array 302 having smaller pixel size. The image sensor array 302 having smaller pixel size will have higher resolution and a large charge handling capacity, meaning the pixels are not as easily saturated. The image sensor array 302 having smaller pixel size therefore will produce a higher quality image for a well lit scene than the image produced by the image sensor array 304 having larger pixel sizes. To further optimize these image sensor arrays 302, 304 for light and dark scenes, the image sensor array 302 having smaller pixel size may be implemented with a longer exposure, while the image sensor array 304 having larger pixel sizes may be implemented with a shorter exposure.

Referring again to FIG. 2, responsive to receiving light 210, the internal image sensor array 202 may generate image data, and may be coupled to the image combination circuit 222 to provide that generated image data to the image combination circuit 222. Similarly, each external image sensor array 212 may generate image data responsive to receiving the light 210. Each external image sensor array 212 may provide its image data to a corresponding receiver 208 within the image sensor 214. The receivers 208a through 208n may receive the image data into the image sensor 214, and may be coupled to the image combination circuit 222 to provide that received image data to the image combination circuit 222. In accordance with the image combination criteria 220, the image combination circuit 222 may combine two or more of the images captured by the image sensor arrays 202, 212. The image combination circuit 222 may be coupled to the transmitter 218 to provide the image data for the combined image to the transmitter 218, which may transmit the image data from the image sensor 214.

The receiver 228 of the image processor 204 may receive the data for the combined image into the image processor 204, and may provide the image data to the image signal processor 206. The image signal processor 206 may process the image data according to any image processing algorithm. For example, the image signal processor may process the image data to implement enhancements such as tone mapping, and the like. The image processor 204 may provide the processed image data to the display 216, which may display the processed combined image in accordance with the processed image data.

Embodiments of the disclosed technology feature several advantages. Compared with the conventional implementation of FIG. 1, the disclosed technology, for example as shown in FIG. 2, requires only one receiver to be implemented within the image processor 204. Fewer receivers means fewer data lines, fewer clock lines, and the like, thereby decreasing the complexity and cost of the image processor 204. Furthermore, the image combination function implemented by the image combination circuit 222 is now performed outside the image processor 204, further reducing the complexity and cost of the image processor 204. Using image sensor arrays 202, 212 configured to capture lights of differing spectra features advantages as well. For example, an infrared image sensor array may produce an image showing structural features that differ from those in an image produced by a visible light image sensor array. The image combination circuit 222 may combine the images to produce an image having useful features from both constituent images, for example for facial recognition in a high security environment.

Figure 4:
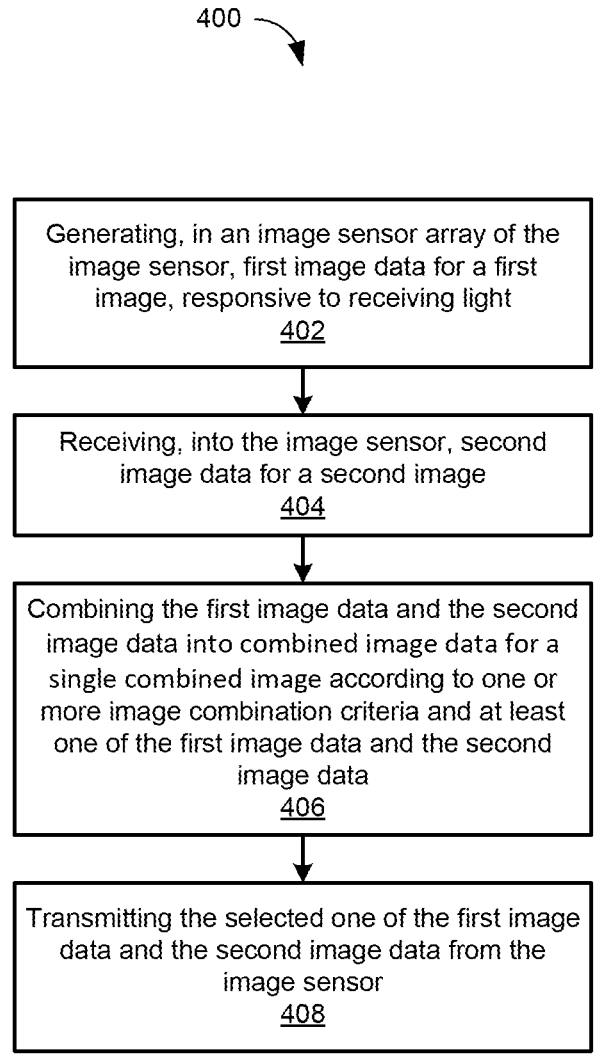
FIG. 4 illustrates a process that may be performed by the imaging system of FIG. 2 according to embodiments of the disclosed technology.

FIG. 4 illustrates a process that may be performed by the imaging system 200 of FIG. 2 according to embodiments of the disclosed technology. Although elements of the process are depicted in a certain sequence, in other embodiments the elements may be performed in other sequences, concurrently, or any combination thereof. In some embodiments, one or more elements may be omitted. Referring to FIG. 4, the process 400 may include generating, in the internal image sensor array 202 of the image sensor 214, first image data for a first image, responsive to receiving the light 210, at 402.

The process 400 may include receiving, into the image sensor 214, second image data for a second image, at 404. The second image data may be generated by one or more of the external image sensor arrays 212. The internal and external image sensor arrays 202, 212 may capture images substantially concurrently. For example, each captured image may correspond to a frame in a sequence of frames, and the image sensor arrays 202, 212 may have the same frame rate and phase. The images may be of the same subject, or of different subjects. The images may be from the same viewpoint, or from different viewpoints. The images may include the same scene, or different scenes.

The process 400 may include combining the first image data and the second image data according to one or more image combination criteria 220, and at least one of the first image data in the second image data, at 406. The image combination criteria 220 may include, for example, extended dynamic range, extended bit depth, any combination thereof, and the like. Process 400 may include transmitting the image data for the combined image data from the image sensor 214, at 408.

Figure 5:
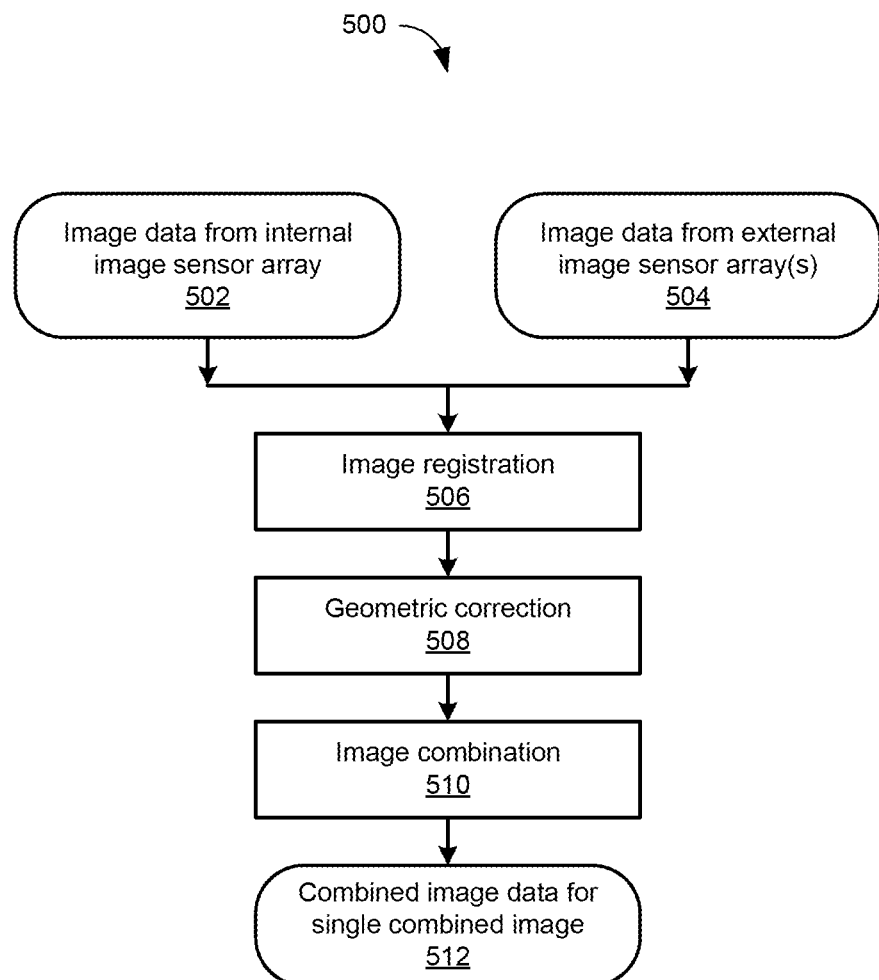
FIG. 5 illustrates a process for the image combination according to embodiments of the disclosed technology.

FIG. 5 illustrates a process for the image combination according to embodiments of the disclosed technology. Although elements of the process are depicted in a certain sequence, in other embodiments the elements may be performed in other sequences, concurrently, or any combination thereof. In some embodiments, one or more elements may be omitted. The process may be employed, for example by the image combination circuit 222 of FIG. 2. Referring to FIG. 5, the process 500 begins with image data received from the internal image sensor array 202, at 502, and image data received from one or more external image sensor arrays 212, at 504. The process 500 may include an image registration process, at 506. During the image registration process, a feature detection process is executed to detect common features in the received image data. The common features are then used to size and align the images, for example through rotation, translation, expansion, contraction, and the like.

The process 500 may include a geometric correction process, at 508. The geometric correction process digitally manipulates the image data, for example to ensure that each images projection precisely matches a specific projection surface or shape. The geometric correction process may compensate for artifacts such as distortion and the like.

The process 500 may include image combination process, at 510. During the image combination process, the image data from the internal sensor array 202, and the image data from one or more external image sensor arrays 212, which may be registered and/or corrected as described above, is combined create combined image data for a single combined image, at 512. The combined image data may then be used, for example as described above.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. An imaging system comprising:
an image sensor comprising
an internal image sensor array to generate first image data for a first image,
multiple receivers to receive, into the image sensor, second image data for multiple second images, and
an image combination circuit coupled to the internal image sensor array to receive the first image data and coupled to the multiple receivers to receive the second image data, the image combination circuit to combine the first image data and the second image data into a combined image; and
multiple external image sensor arrays each coupled to a respective one of the multiple receivers of the image sensor to generate the second image data for the multiple second images, wherein the multiple external image sensor arrays are external to the image sensor;
wherein a first one of the internal and external image sensor arrays has a first gain, a second one of the internal and external image sensor arrays has a second gain, and the first gain is greater than the second gain.

2. The imaging system of claim 1, further comprising:
an image signal processor to process the combined image into a processed image.

3. The imaging system of claim 2, further comprising:
a display to display the processed image.

4. The imaging system of claim 1, wherein:
the first image includes a scene;
the multiple second images include the scene; and
the combined image is a high dynamic range image.

5. The imaging system of claim 1, wherein:
the first image includes a subject;
the multiple second images include the subject; and
the combined image represents a three-dimensional (3D) image.

6. The imaging system of claim 1, wherein:
the first image and the multiple second images are captured concurrently.

7. The imaging system of claim 1, wherein the internal image sensor array and the multiple external image sensor arrays possess different image capture characteristics, wherein the image capture characteristics include at least one of:
sensitivity;
read noise;
pixel size;
exposure time; and
spectrum.

8. An image sensor comprising:
an internal image sensor array to generate first image data for a first image;
multiple receivers to receive, into the image sensor from multiple external image sensor arrays, second image data for multiple second images; and
an image combination circuit coupled to the internal image sensor array to receive the first image data and coupled to the multiple receivers to receive the second image data, the image combination circuit to combine the first image data and the second image data into a combined image;
wherein a first one of the internal and external image sensor arrays has a first gain, a second one of the internal and external image sensor arrays has a second gain, and the first gain is greater than the second gain.

9. The image sensor of claim 8, wherein:
the first image includes a scene;
the multiple second images include the scene; and
the combined image is a high dynamic range image.

10. The image sensor of claim 8, wherein:
the first image includes a subject;
the multiple second images include the subject; and
the combined image is a three-dimensional (3D) image.

11. The image sensor of claim 8, wherein:
the first image and the multiple second images are captured concurrently.

12. The image sensor of claim 8, wherein the internal image sensor array and the multiple external image sensor arrays possess different image capture characteristics, wherein the image capture characteristics include at least one of:
sensitivity;
read noise;
pixel size;
exposure time; and
spectrum.

13. The image sensor of claim 8, wherein:
the multiple receivers are Mobile Industry Processor Interface (MIPI) receivers.

14. A single integrated circuit comprising the image sensor of claim 8.

15. A method comprising:
generating, in an internal image sensor array of an image sensor, first image data for a first image;
receiving, into multiple receivers of the image sensor from multiple external image sensor arrays, second image data for multiple second images; and
combining, in an image combination circuit coupled to the internal image sensor array and the multiple receivers, the first image data and the second image data into a combined image;
wherein a first one of the internal and external image sensor arrays has a first gain, a second one of the internal and external image sensor arrays has a second gain, and the first gain is greater than the second gain.

16. The method of claim 15, wherein:
the first image includes a scene;
the multiple second images include the scene; and
the combined image is a high dynamic range image.

17. The method of claim 15, wherein:
the first image includes a subject;
the multiple second images include the subject; and
the combined image is a three-dimensional (3D) image.

18. The method of claim 15, wherein:
the first image and the multiple second images are captured concurrently.

19. The method of claim 15, wherein the internal image sensor array and the multiple external image sensor arrays possess different image capture characteristics, wherein the image capture characteristics include at least one of:
sensitivity;
read noise;
pixel size;
exposure time; and
spectrum.

20. The method of claim 15, wherein:
the multiple receivers are Mobile Industry Processor Interface (MIPI) receivers.

* * * * *